US007995017B2

(12) United States Patent
Kim

(10) Patent No.: US 7,995,017 B2
(45) Date of Patent: Aug. 9, 2011

(54) LIQUID CRYSTAL DISPLAY AND THIN FILM TRANSISTOR ARRAY PANEL THEREFOR

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1014 days.

(21) Appl. No.: 11/734,089

(22) Filed: Apr. 11, 2007

(65) Prior Publication Data

US 2007/0182908 A1 Aug. 9, 2007

Related U.S. Application Data

(63) Continuation of application No. 10/844,538, filed on May 13, 2004, now Pat. No. 7,206,054.

(30) Foreign Application Priority Data

May 13, 2003 (KR) .............................. 2003-0030193
Jul. 18, 2003 (KR) ................................. 2003-49027

(51) Int. Cl.
*G09G 3/36* (2006.01)
(52) U.S. Cl. ........... 345/88; 349/144; 349/145; 349/146
(58) Field of Classification Search .................... 345/88, 345/589–605
See application file for complete search history.

(56) References Cited

U.S. PATENT DOCUMENTS

| 5,132,819 | A | 7/1992 | Noriyama et al. |
| 5,408,252 | A | 4/1995 | Oki et al. |
| 5,818,407 | A | 10/1998 | Hori et al. |
| 6,191,831 | B1 * | 2/2001 | Kim et al. .................. 349/43 |
| 6,259,503 | B1 | 7/2001 | Watanabe et al. |
| 6,278,503 | B1 | 8/2001 | Nishikawa et al. |
| 6,639,640 | B1 * | 10/2003 | Matsuoka et al. ............ 349/139 |
| 6,680,772 | B2 | 1/2004 | Lee |
| 6,862,052 | B2 | 3/2005 | Kim |
| 6,917,410 | B2 * | 7/2005 | Song et al. .................... 349/178 |
| 2001/0019391 | A1 | 9/2001 | Kim et al. |
| 2002/0030782 | A1 | 3/2002 | Lee |
| 2002/0057411 | A1 | 5/2002 | Kim et al. |
| 2002/0149728 | A1 | 10/2002 | Ogishima et al. |
| 2003/0043327 | A1 | 3/2003 | Aoyama et al. |
| 2003/0197825 | A1 | 10/2003 | Lee et al. |
| 2004/0119924 | A1 * | 6/2004 | Takeda et al. ................ 349/129 |
| 2004/0233367 | A1 | 11/2004 | Kim et al. |

FOREIGN PATENT DOCUMENTS

| CN | 1211745 A | 3/1999 |
| JP | 06-250220 | 9/1994 |
| JP | 07-152013 | 6/1995 |
| JP | 11-258606 | 9/1999 |
| JP | 11-337918 | 12/1999 |
| JP | 2000-002889 A | 7/2000 |
| JP | 2003-131636 | 5/2003 |

(Continued)

*Primary Examiner* — Kevin M Nguyen
*Assistant Examiner* — Kenneth B Lee, Jr.
(74) *Attorney, Agent, or Firm* — Innovation Counsel LLP

(57) ABSTRACT

A thin film transistor array panel is provided, which includes: a substrate; a first signal line formed on the substrate; a second signal line formed on the substrate and having an intersecting portion intersecting the first signal line and a curved portion connected to the intersecting portion; a first thin film transistor connected to the first and the second signal lines; and a pixel electrode that are connected to the first thin film transistor, includes first and second partitions, and are curved along the curved portion of the second signal line.

10 Claims, 12 Drawing Sheets

FOREIGN PATENT DOCUMENTS

| | | |
|---|---|---|
| KR | 1997-0009405 | 6/1997 |
| KR | 1019990006951 A | 1/1999 |
| KR | 10-1999-0026575 | 4/1999 |
| KR | 10-0218584 | 9/1999 |
| KR | 1020000004420 A | 1/2000 |
| KR | 1020000053522 A | 8/2000 |
| KR | 10-2000-0057973 | 9/2000 |
| KR | 1020030047366 A | 6/2003 |

\* cited by examiner

LIQUID CRYSTAL DISPLAY AND THIN FILM TRANSISTOR ARRAY PANEL THEREFOR

CROSS-REFERENCE TO RELATED APPLICATIONS

The present application is a continuation of, claims benefit of, and incorporates by reference the disclosure of U.S. patent application Ser. No. 10/844,538 filed on May 13, 2004 now U.S. Pat. No. 7,206,054 by D G Kim, where the latter US application claims benefit of Korean Patent Application No. 10 2003 003193, filed on May 13, 2003, and Korean Patent Application No. 2003-49027 filed on Jul. 18, 2003, whose disclosures are also incorporated herein by reference.

BACKGROUND OF THE INVENTION (a) Field of the Invention

The present invention relates to a liquid crystal display and a thin film transistor array panel.

(b) Description of the Related Art

A liquid crystal display (LCD) is one of the most widely used flat panel displays. An LCD includes two panels provided with field-generating electrodes and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

The LCD has a disadvantage of narrow viewing angle. Various techniques for enlarging the viewing angle are suggested and a technique utilizing a vertically aligned LC and providing cutouts or protrusions at the field-generating electrodes such as pixel electrodes and a common electrode is promising.

Since the cutouts and the protrusions reduce the aperture ratio, the size of the pixel electrodes is suggested to be maximized. However, the close distance between the pixel electrodes causes strong lateral electric fields between the pixel electrodes, which dishevels orientations of the LC molecules to yield textures and light leakage, thereby deteriorating display characteristic.

In the meantime, photo etching processes are performed to form various patterns on the panels of the LCD through light exposure.

When a backplane for LCDs is too large to use an exposure mask, the entire exposure is accomplished by repeating a divisional exposure called step-and-repeat process. One divisional exposure unit or area is called a shot. Since transition, rotation, distortion, and etc. are generated during light exposure, the shots are not aligned accurately. Accordingly, parasitic capacitances generated between wires and pixel electrodes differ depending on the shots, and this causes the bright difference between the shots, which is recognized at the pixels located at a boundary between the shots. Therefore, the stitch defect is generated on the screen of the LCD due to brightness discontinuity between the shots.

SUMMARY OF THE INVENTION

A thin film transistor array panel is provided, which includes: a substrate; a first signal line formed on the substrate; a second signal line formed on the substrate and having an intersecting portion intersecting the first signal line and a curved portion connected to the intersecting portion; a first thin film transistor connected to the first and the second signal lines; and a pixel electrode that are connected to the first thin film transistor, includes first and second partitions, and are curved along the curved portion of the second signal line.

The curved portion of the second signal line may include a pair of rectilinear portions connected to each other and making an angle of about 45 degrees with the first signal line.

The thin film transistor array panel may further include a second thin film transistor connected to the second partition of the pixel electrode, wherein the first thin film transistor is connected to the first partition of the pixel electrode. The first and the second partitions may be disposed opposite each other with respect to the second signal line and the first and the second thin film transistors may be disposed opposite each other with respect to the second signal line.

The thin film transistor array panel may further include a connection connecting the first partition and the second partition.

The connection may intersect a curved point of the curved portion of the second signal line. The connection may include the same layer as the pixel electrode or the gate line.

The connection may be disposed near the intersecting portion of the second signal line and may include the same layer as the pixel electrode.

An edge of the pixel electrode may overlap the data line.

The thin film transistor array panel may further include a third signal line separated from the first and the second signal lines and having a portion overlapping the pixel electrode or a portion of the first thin film transistor that are connected to the pixel electrode.

The third signal line may further include a branch disposed near at least an edge of the first or the second partition of the pixel electrode.

The at least an edge of the first or the second partition of the pixel electrode may overlap the branch of the third signal line.

The first partition and the second partition of the pixel electrode may make a gap therebetween, and the gap may extend parallel to the second signal line. The gap preferably overlaps the second signal line or the branch of the third signal line.

The pixel electrode and the second signal line may make a gap therebetween, and the gap may extend parallel to the second signal line. The branch of the third signal line may be disposed between the pixel electrode and the second signal line and it may overlap an edge of the pixel electrode.

A thin film transistor array panel is provided, which includes: a substrate; a gate line formed on the substrate and including a gate electrode; a gate insulating layer formed on the gate line; a semiconductor layer formed on the gate insulating layer; a data line having an intersecting portion intersecting the gate line and a curved portion connected to the intersecting portion and including a source electrode formed on semiconductor layer at least in part; a first drain electrode formed on semiconductor layer at least in part and located opposite the source electrode; a passivation layer formed on the semiconductor layer; and a pixel electrode that are connected to the first drain electrode, includes first and second partitions, and has an edge adjacent to the data line and curved along the data line.

The curved portion of the data line may include a pair of rectilinear portions connected to each other and making an angle of about 45 degrees with the gate line.

The thin film transistor array panel may further include a storage electrode line separated from the gate line and the data line, extending substantially parallel to the gate line, and including a storage electrode having an increased area overlapping the first drain electrode.

The thin film transistor array panel may further include a second drain electrode connected to the second partition of the pixel electrode, wherein the first drain electrode is connected to the first partition of the pixel electrode.

The first and the second partitions may be disposed opposite each other with respect to the data line and the first and the second drain electrodes may be disposed opposite each other with respect to the data line.

The thin film transistor array panel may further include a storage electrode line separated from the gate line and the data line, extending substantially parallel to the gate line, and including a storage electrode overlapping an edge of the first or the second partition of the pixel electrode.

The thin film transistor array panel may further include a connection connecting the first partition and the second partition. The connection may further include the same layer as the pixel electrode or the gate line and it may intersect the data line.

The data line may be disposed near an outer edge of the pixel electrode.

The thin film transistor array panel may further include a color filter disposed under the passivation layer and curved along the curved portion of the second signal line.

A liquid crystal display is provided, which includes: a first substrate; a first signal line formed on the first substrate; a second signal line formed on the first substrate and having an intersecting portion intersecting the first signal line and a curved portion connected to the intersecting portion; a thin film transistor connected to the first and the second signal lines; a pixel electrode that are connected to the thin film transistor and includes first and second partitions; a second substrate facing the first substrate; a common electrode formed on the second substrate; a liquid crystal layer interposed between the first substrate and the second substrate; and a domain defining member dividing the liquid crystal layer into a plurality of domains, each domain having two primary edges parallel to the curved portion of the second signal line.

The liquid crystal display may further include a third signal line separated from the first and the second signal lines, overlapping the pixel electrode to form a storage capacitor, and including a branch extending parallel to the second signal line.

The liquid crystal layer may have negative dielectric anisotropy and it is aligned substantially perpendicular to a surface of the first and the second substrates.

The liquid crystal layer may have positive dielectric anisotropy and it is aligned substantially parallel to a surface of the first and the second substrates and twisted from the first substrate to the second substrate.

The domain defining member may include a protrusion disposed on the common electrode or a cutout formed at the common electrode or the pixel electrode.

BRIEF DESCRIPTION OF THE DRAWINGS

The present invention will become more apparent by describing embodiments thereof in detail with reference to the accompanying drawings in which.

DETAILED DESCRIPTION OF PREFERRED EMBODIMENTS

Figure 1:
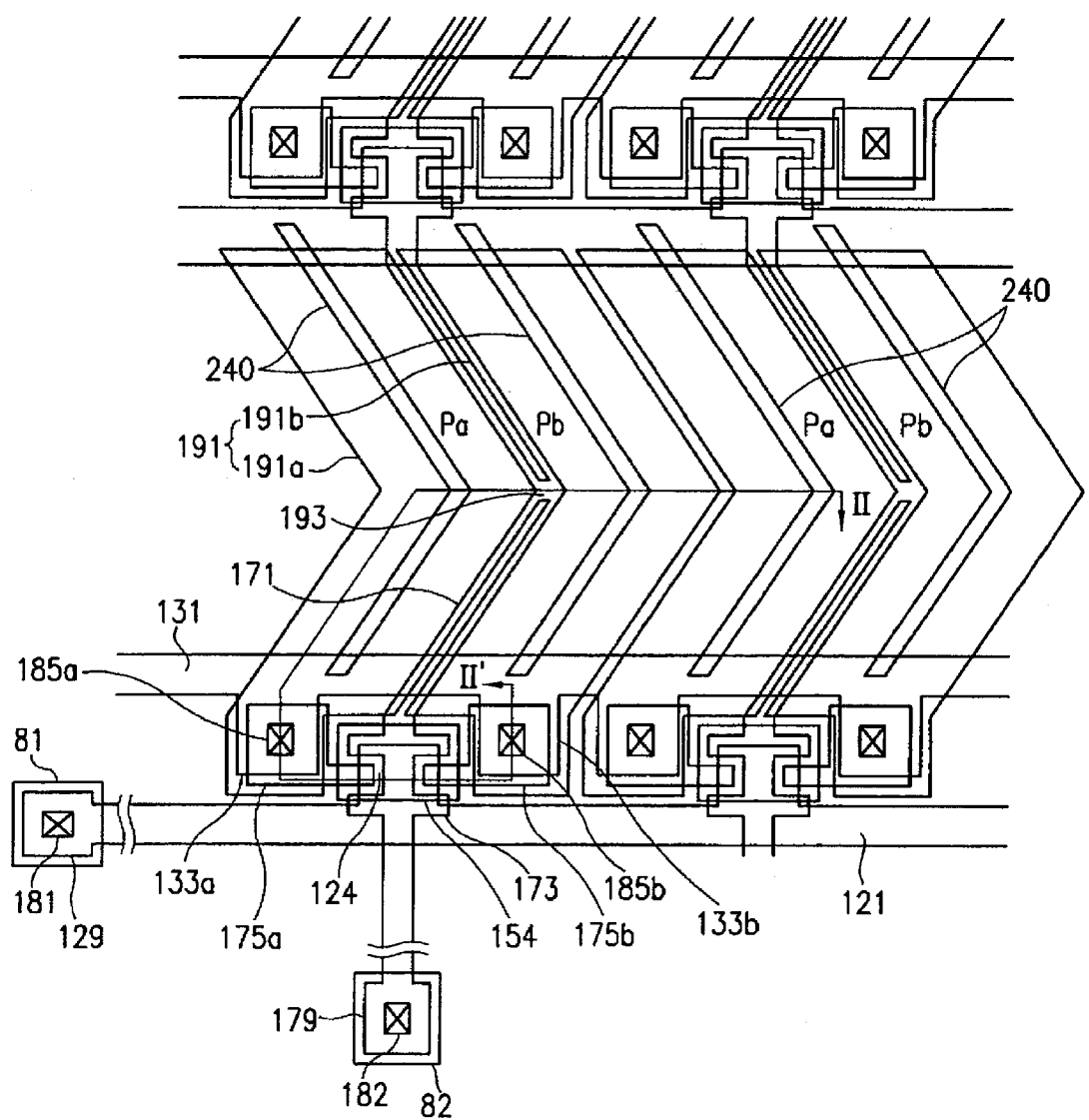
FIG. 1 is a layout view of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

Figure 2:
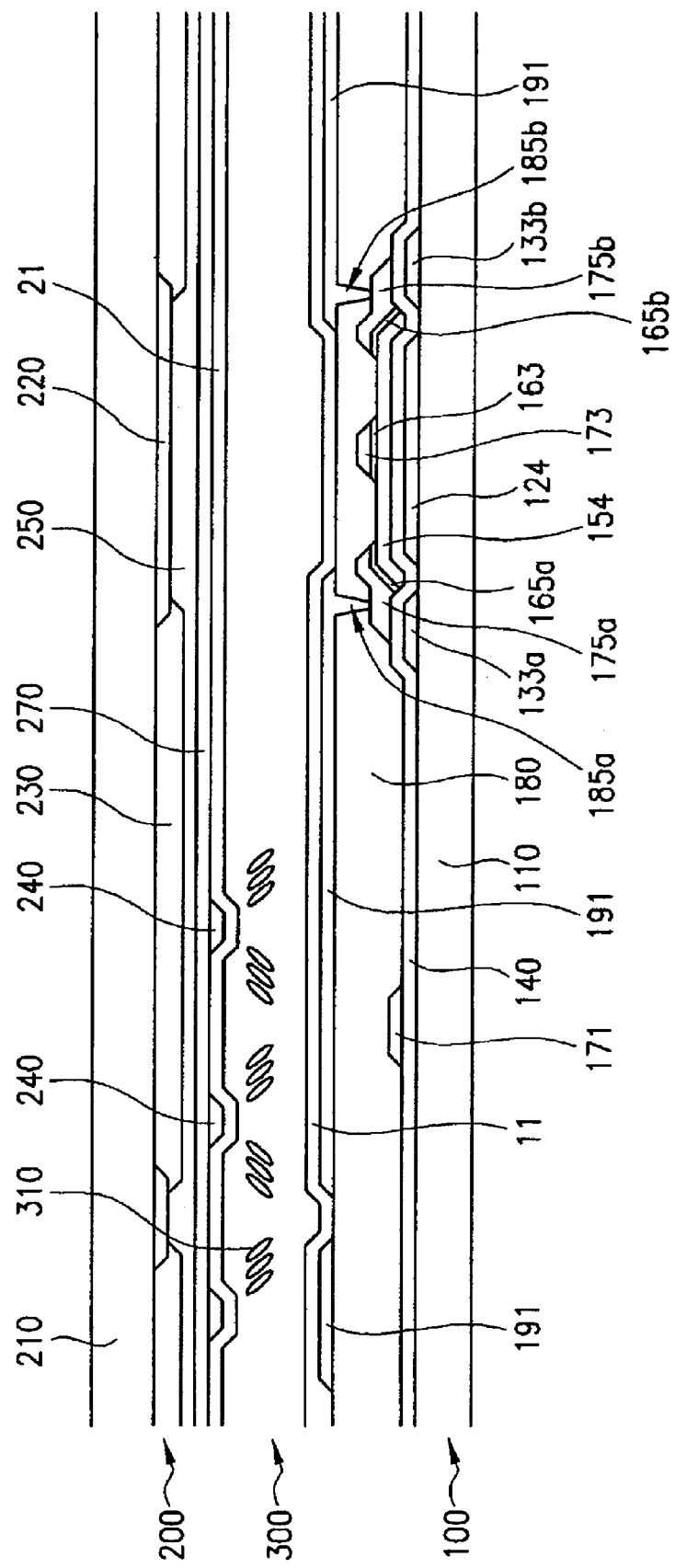
FIG. 2 is a sectional view of the LCD shown in FIG. 1 taken along the line II-II'.

FIG. 1 is a layout view of an LCD according to an embodiment of the present invention, and FIG. 2 is a sectional view of the LCD shown in FIG. 1 taken along the line II-II'.

An LCD according to an embodiment of the present invention includes a TFT array panel 100, a common electrode panel 200, and a LC layer 300 interposed between the panels 100 and 200 and containing a plurality of LC molecules 310 aligned vertical to surfaces of the panels 100 and 200.

The TFT array panel 100 is now described in detail.

A plurality of gate lines 121 and a plurality of storage electrode lines 131 are formed on an insulating substrate 110.

The gate lines 121 extend substantially in a transverse direction and they are separated from each other and transmit gate signals. Each gate line 121 includes a plurality of projections forming a plurality of gate electrodes 124 and an end portion 129 having a large area for contact with another layer or an external device.

Each storage electrode line 131 extends substantially in the transverse direction and includes a plurality of pairs of projections forming storage electrodes 133a and 133b. The storage electrodes 133a and 133b have a shape of rectangle (or diamond) and they are located close to the gate electrodes 124. The storage electrode lines 131 are supplied with a predetermined voltage such as a common voltage, which is applied to a common electrode 270 on the common electrode panel 200 of the LCD.

The gate lines 121 and the storage electrode lines 131 are preferably made of Al and Al alloy, Ag containing metal such as Ag and Ag alloy, Cu containing metal such as Cu and Cu alloy, Cr, Mo, Mo alloy, Ta, or Ti. They may have a multi-layered structure including two films having different physical characteristics, a lower film (not shown) and an upper film (not shown). The upper film is preferably made of low resistivity metal including Al containing metal for reducing signal delay or voltage drop in the gate lines 121 and the storage electrode lines 131. On the other hand, the lower film is preferably made of material such as Cr, Mo and Mo alloy, Ta or Ti, which has good physical, chemical, and electrical contact characteristics with other materials such as indium tin oxide (ITO) or indium zinc oxide (IZO). A good exemplary combination of the lower film material and the upper film material is Cr and Al—Nd alloy.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor islands 154 preferably made of hydrogenated amorphous silicon (abbreviated as "a-Si") or polysilicon are formed on the gate insulating layer 140. Each semiconductor island 154 is located opposite the gate electrodes 124.

A plurality of ohmic contact islands 163, 165a and 165b preferably made of silicide or n+ hydrogenated a-Si heavily doped with n type impurity are formed on the semiconductor islands 154.

The lateral sides of the semiconductor islands 154 and the ohmic contacts 163, 165a and 165b are inclined relative to the surface of the substrate 110, and the inclination angles thereof are preferably in a range between about 30-80 degrees.

A plurality of data lines 171 and a plurality of pairs of drain electrodes 175a and 175b separated from each other are formed on the ohmic contacts 163, 165a and 165b and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of pairs of oblique portions and a plurality of longitudinal portions such that it curves periodically. A pair of oblique portions are connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion, that is, it occupies about 50-90 percents of the total length of the pair of oblique portions and the longitudinal portion.

Each drain electrode 175a or 175b includes an expansion overlapping a storage electrode 133a or 133b. A pair of drain electrodes 175a and 175b are located opposite each other with respect to a longitudinal portion of a data line 171. Each longitudinal portion of the data lines 171 includes a plurality of projections projected from left and right sides thereof such that the longitudinal portion including the projections forms a source electrode 173 partly enclosing the drain electrodes 175a and 175b. Each set of a gate electrode 124, a source electrode 173, and a pair of drain electrode 175a and 175b along with a semiconductor island 154 form a pair of TFTs having respective channels formed in the semiconductor island 154 disposed between the source electrode 173 and the drain electrodes 175a and 175b, respectively.

The data lines 171 and the drain electrodes 175a and 175b are preferably made of refractor metal such as Cr, Mo, Mo alloy, Ta and Ti. They may also include a lower film (not shown) preferably made of Mo, Mo alloy or Cr and an upper film (not shown) located thereon and preferably made of Al containing metal.

Like the gate lines 121 and the storage electrode lines 131, the data lines 171 and the drain electrodes 175a and 175b have inclined lateral sides, and the inclination angles thereof range about 30-80 degrees.

The ohmic contacts 163, 165a and 165b are interposed only between the underlying semiconductor islands 154 and the overlying data lines 171 and the overlying drain electrodes 175a and 175b thereon and reduce the contact resistance therebetween.

A passivation layer 180 is formed on the data lines 171 and the drain electrodes 175a and 175b, and exposed portions of the semiconductor islands 154, which are not covered with the data lines 171 and the drain electrodes 175a and 175b. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film.

The passivation layer 180 has a plurality of contact holes 185a, 185b and 182 exposing the drain electrodes 175a and 175b and the end portions 179 of the data lines 171, respectively. The passivation layer 180 and the gate insulating layer 140 have a plurality of contact holes 181 exposing end portions 129 of the gate lines 121. The contact holes 181, 185a, 185b and 182 can have various shapes such as polygon or circle. The area of each contact hole 181 or 182 is preferably equal to or larger than 0.5 mm×15 μm and not larger than 2 mm×60 μm. The sidewalls of the contact holes 181, 185a, 185b and 182 are inclined with an angle of about 30-85 degrees or have stepwise profiles.

A plurality of pixel electrodes 191 and a plurality of contact assistants 81 and 82, which are preferably made of ITO, IZO or Cr, are formed on the passivation layer 180.

Each pixel electrode 191 includes a pair of partitions 191a and 191b that are disposed opposite each other with respect to a data line 171 and connected through a connection 193. A pair of partitions 191a and 191b form a pair of subpixel areas Pa and Pb. Each partition 191a or 191b of each pixel electrode 191 has long edges extending parallel to the data lines 171 and short edges extending parallel to the gate lines 121, thereby forming a chevron.

The partitions 191a and 191b of each pixel electrode 191 are physically and electrically connected to the drain electrodes 175a and 175b through the contact holes 185a and 185b, respectively, such that the pixel electrode 191 receives the data voltages from the drain electrodes 175a and 175b. The pixel electrode 191 supplied with the data voltages generate electric fields in cooperation with the common electrode 270, which reorient liquid crystal molecules 310 disposed therebetween.

A pixel electrode 191 and the common electrode 270 form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 191 with the storage electrode lines 131. The capacitances of the storage capacitors, i.e., the storage capacitances are increased by providing the projections (i.e., the storage electrodes) 133a and 133b at the storage electrode lines 131, elongating the drain electrodes 175a and 175b connected to the pixel electrodes 191a and 191b, and providing the expansions at the drain electrodes 175a and 175b overlapping the storage electrodes 133a and 133b of the storage electrode lines 131 for decreasing the distance between the terminals and increasing the overlapping areas.

The pixel electrodes 191 overlap the data lines 171 to increase aperture ratio but it is optional.

The contact assistants 81 and 82 are connected to the exposed end portions 129 of the gate lines 121 and the exposed end portions 179 of the data lines 171 through the contact holes 181 and 182, respectively. The contact assistants 81 and 82 are not requisites but preferred to protect the exposed portions 129 and 179 and to complement the adhesiveness of the exposed portions 129 and 179 and external devices.

Finally, an alignment layer 11 is formed on the pixel electrodes 191a and 191b, the contact assistants 81 and 82, and the passivation layer 180.

The description of the common electrode panel 200 follows.

A light blocking member 220 called a black matrix for preventing light leakage is formed on an insulating substrate 210 such as transparent glass. The light blocking member 220 may include a plurality of openings that face the partitions 191a and 191b of the pixel electrodes 191 and may have substantially the same shape as the partitions 191a and 191b. Otherwise, the light blocking member 220 may include oblique linear portions corresponding to the oblique portions of the data lines 171, longitudinal portions corresponding to the longitudinal portions of the data lines 171, and other portions corresponding to the TFTs.

A plurality of red, green and blue color filters 230 are formed on the substrate 210 and they are disposed substantially in the areas enclosed by the light blocking member 220. The color filters 230 may extend substantially along the longitudinal direction along the pixel electrodes 191.

An overcoat 250 is formed on the color filters 230, and a common electrode 270 preferably made of transparent conductive material such as ITO and IZO is formed on the overcoat 250. The overcoat 250 may be omitted.

A plurality of protrusions 240 are formed on the common electrode 270. Each protrusion 240 has main edges parallel to long edges of the partitions 191a and 191b of the pixel electrodes 191 and it may have inclined lateral surface. The protrusion 240 is disposed near a center of a partition 191a or 191b of the pixel electrodes 191 and spaced apart from opposite long edges of the partition 191a or 191b such that it bisects the partition 191a or 191b into left and right halves. The protrusions 240 are provided for controlling the tilt directions of the LC molecules 310 in the LC layer 300 and preferably have a width in a range between about 5-10 microns. End portions of the protrusions 240 may have various shapes.

A homogeneous or homeotropic alignment layer 21 is coated on the common electrode 270.

A pair of polarizers (not shown) are provided on outer surfaces of the panels 100 and 200 such that their transmissive axes are crossed and one of the transmissive axes is parallel to the gate lines 121.

The LCD may further include at least one retardation film for compensating the retardation of the LC layer 300.

The LC molecules 310 in the LC layer 300 are aligned such that their long axes are vertical to the surfaces of the panels 100 and 200. However, the long axes of the LC molecules 310 near the inclined surfaces of the protrusions 240 are perpendicular to the inclined surfaces and thus they are inclined relative to the surfaces of the panels 100 and 200. The liquid crystal layer 300 has negative dielectric anisotropy.

Upon application of a common voltage to the common electrode 270 and a data voltage to the pixel electrodes 191, a primary electric field substantially perpendicular to the surfaces of the panels 100 and 200 is generated. The LC molecules 310 tend to change their orientations in response to the electric field such that their long axes are perpendicular to the field direction. Since the LC molecules 310 near the protrusions 240 are pre-tilted, the tilt directions of most LC molecules 310 are determined by the pre-tilt directions and they are perpendicular to the length directions of the protrusions 240. In addition, the edges of the partitions 191a and 191b of the pixel electrodes 191 distort the primary electric field to have a horizontal component which affects the tilt directions of the LC molecules 310. Since the generated horizontal component of the primary electric field is perpendicular to the edges of the pixel electrodes 191 that extend parallel to the protrusions 240, it coincides with the tilt directions determined by the protrusions 240. Accordingly, four domains having different tilt directions are formed in the LC layer 300.

In the meantime, the direction of a secondary electric field due to the voltage difference between the pixel electrodes 191 is perpendicular to the edges of the pixel electrodes 191a and 191b. Accordingly, the field direction of the secondary electric field also coincides with the tilt directions determined by the protrusions 240. Consequently, the secondary electric field between the pixel electrodes 191 enhances the tilt directions of the LC molecules 310.

Since the LCD performs inversion such as dot inversion, column inversion, etc., adjacent pixel electrodes are supplied with data voltages having opposite polarity with respect to the common voltage and thus a secondary electric field between the adjacent pixel electrodes is almost always generated to enhance the stability of the domains.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers gives maximum transmittance, the polarizers can be attached such that the transmissive axes of the polarizers are parallel to or perpendicular to the edges of the panels 100 and 200 and it reduces the production cost.

The increased resistance of the data lines 171 due to the curving can be compensated by widening the data lines 171 since distortion of the electric field and increase of the parasitic capacitance due to the increase of the width of the data lines 171 can be compensated by maximizing the size of the pixel electrodes 191 and by adapting a thick organic passivation layer.

Since a pair of TFTs and a pair of partitions 191a and 191b of a pixel electrode 191 are aligned symmetrical to a gate electrode 124 and a data line 171, respectively, the parasitic capacitances between the data line 171 and the pixel electrodes 191 and between the gate electrode 124 and the drain electrodes 175a and 175b are kept constant and the brightness difference between shots is reduced.

The protrusions 240 may be substituted with a plurality of cutouts (not shown) formed at the common electrode 270 since the tilt directions of the LC molecules 310 can be also controlled by fringe field generated by the cutouts. The width of the cutouts is preferably in a range of about 9-12 microns.

A method of manufacturing the TFT array panel shown in FIGS. 1 and 2 according to an embodiment of the present invention will be now described in detail.

A plurality of gate lines 121 including a plurality of gate electrodes 124 and a plurality of storage electrode lines 131 including a plurality of storage electrodes 133a and 133b are formed on an insulating substrate 110 such as transparent glass.

When the gate lines 121 and the storage electrode lines 131 have a double-layered structure including a lower conductive film and an upper conductive film, the lower conductive film is preferably made of material such as Mo or Cr alloy having good physical and chemical characteristics and the upper conductive film is preferably made of Al or Al containing metal.

After sequential deposition of a gate insulating layer 140 with thickness of about 1,500-5,000 Å, an intrinsic a-Si layer with thickness of about 500-2,000 Å, and an extrinsic a-Si layer with thickness of about 300-600 Å, the extrinsic a-Si layer and the intrinsic a-Si layer are photo-etched to form a plurality of extrinsic semiconductor islands and a plurality of intrinsic semiconductor islands 154 on the gate insulating layer 140.

Subsequently, a plurality of date lines 171 including a plurality of source electrodes 173 and a plurality of drain electrodes 175a and 175b are formed.

Thereafter, portions of the extrinsic semiconductor islands, which are not covered with the data lines 171 and the drain electrodes 175a and 175b, are removed to complete a plurality of ohmic contact islands 163 and 165 and to expose portions of the intrinsic semiconductor islands 154. Oxygen plasma treatment preferably follows thereafter in order to stabilize the exposed surfaces of the semiconductor islands 154.

A passivation layer 180 is formed by coating a photosensitive organic insulating material such as acryl-based material.

After depositing a passivation layer 180, the passivation layer 180 and the gate insulating layer 140 are patterned to form a plurality of contact holes 181, 185a, 185b and 182 exposing end portions 129 of the gate lines 121, the drain electrodes 175a and 17bb, and end portions 179 of the data lines 171, respectively.

Finally, a plurality of pixel electrodes 191 and a plurality of contact assistants 81 and 82 are formed on the passivation layer 180 by sputtering and photo-etching IZO or ITO layer with thickness of about 400-500 Å.

A TFT array panel for an LCD according to another embodiment of the present invention will be described in detail with reference to FIGS. 3 and 4.

Figure 3:
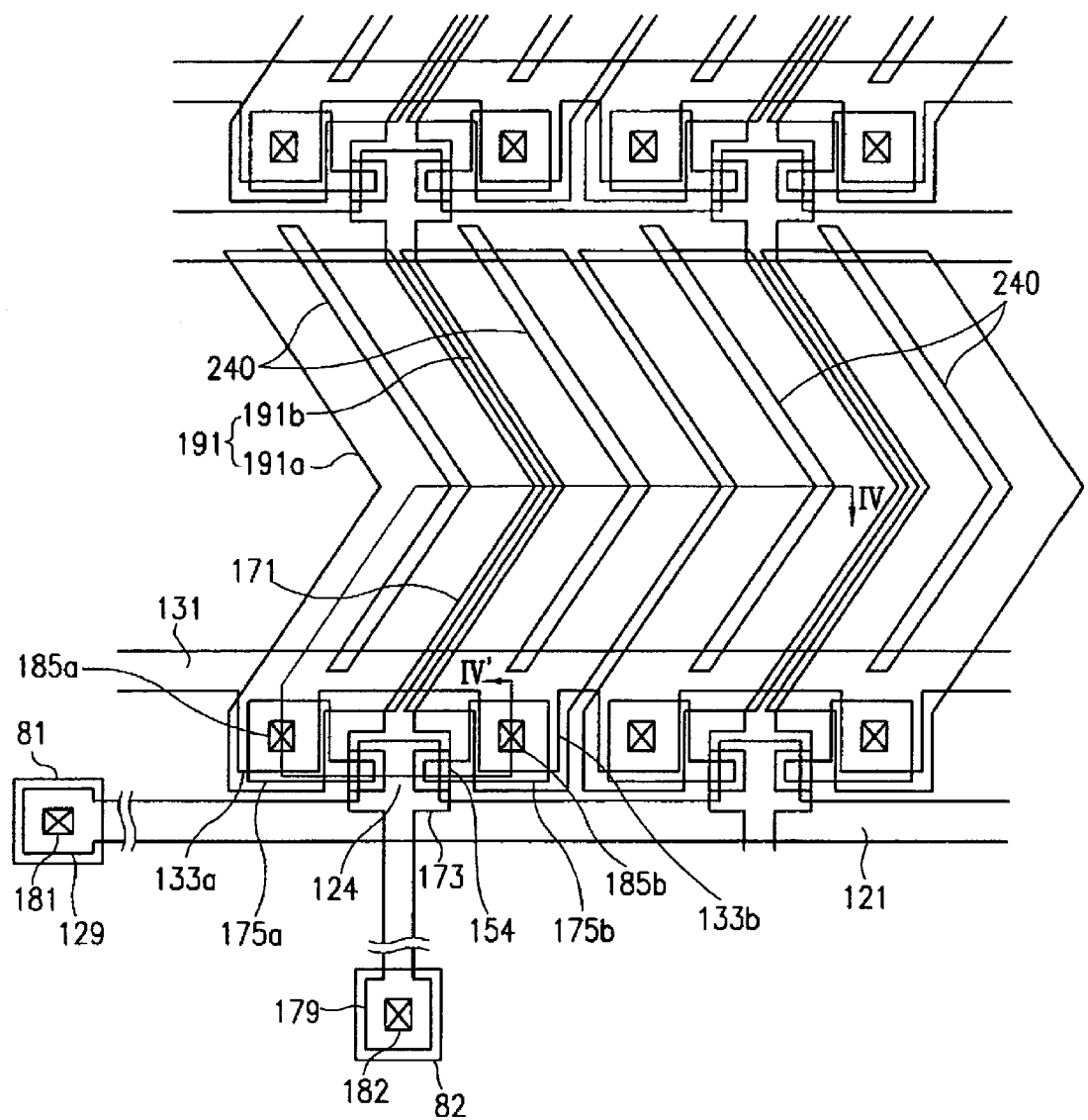
FIG. 3 is a layout view of an LCD according to another embodiment of the present invention.
Figure 4:
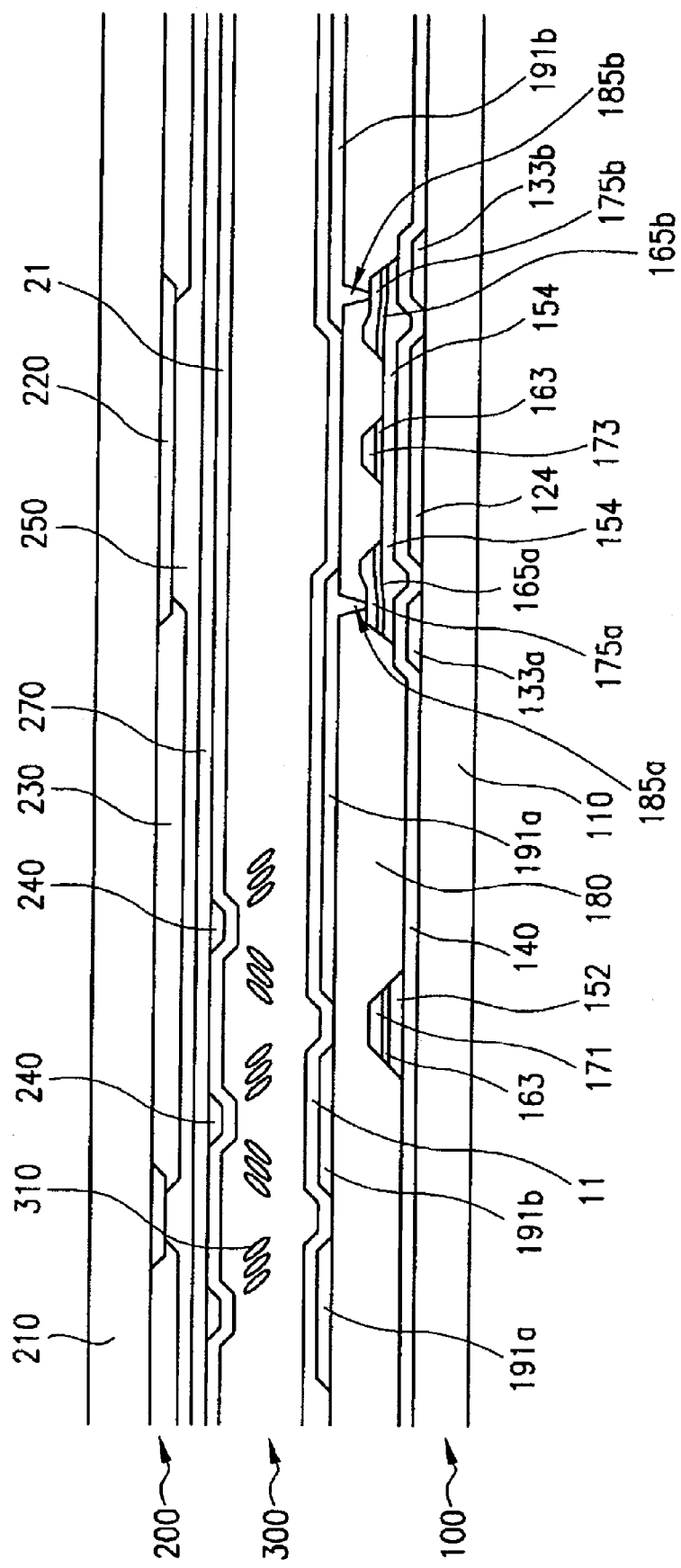
FIG. 4 is a sectional view of the LCD shown in FIG. 3 taken along the line IV-IV'.

FIG. 3 is a layout view of an LCD according to another embodiment of the present invention, and FIG. 4 is a sectional view of the LCD shown in FIG. 3 taken along the line IV-IV'.

As shown in FIGS. 3 and 4, a layered structure of a TFT array panel of an LCD according to this embodiment is almost the same as that shown in FIGS. 1 and 2. That is, a plurality of gate lines 121 including a plurality of gate electrodes 124 and a plurality of storage electrodes lines 131 including a plurality of storage electrodes 133a and 133b are formed on a substrate 110. A gate insulating layer 140, a plurality of semiconductor stripes 152 and a plurality of ohmic contact stripes and islands 163, 165a and 165b are sequentially formed thereon. A plurality of data lines 171 including a plurality of source electrodes 173 and a plurality of drain electrodes 175a and 175b are formed on the ohmic contacts 163 and 165, and a passivation layer 180 is formed thereon. A plurality of contact holes 181, 185a, 185b and 183 are provided at the passivation layer 180 and the gate insulating layer 140, and a plurality of pixel electrodes 191 including a plurality of pairs of partitions 191a and 191b and a plurality of contact assistants 81 and 82 are formed on the passivation layer 180. Finally, an alignment layer 11 is formed on the pixel electrodes 191 and the passivation layer 180.

In addition, a layered structure of a common electrode panel of the LCD according to this embodiment is almost the same as that shown in FIGS. 1 and 2. That is, a light blocking member 220, a plurality of red, green and blue color filters 230, an overcoat 250, a common electrode 270, and a plurality of protrusions 240 as well as an alignment layer 21 are sequentially formed on an insulating substrate 210.

Different from the TFT array panel shown in FIGS. 1 and 2, the TFT array panel according to this embodiment extends the semiconductors 152 and the ohmic contacts 163 along the data lines 171.

The semiconductor stripes 152 have almost the same planar shapes as the data lines 171 and the drain electrodes 175a and 175b as well as the underlying ohmic contacts 163 and 165, except for channel portions 154 of the TFTs.

Furthermore, a pair of partitions 191a and 191b of a pixel electrode 191 are disconnected from each other.

A manufacturing method of the TFT array panel according to an embodiment simultaneously forms the data lines 171, the drain electrodes 175a and 175b, the semiconductors 152, and the ohmic contacts 163 and 165 using one photolithography process. A photoresist pattern for the photolithography process has position-dependent thickness, and in particular, it has portions with smaller thickness located on the channels of TFTs. As a result, a photolithography process can be omitted to simplify the manufacturing process.

Many of the above-described features of the LCD shown in FIGS. 1 and 2 may be appropriate to the LCD shown in FIGS. 3 and 4.

An LCD according another embodiment of the present invention will be described in detail with reference to FIGS. 5 and 6.

Figure 5:
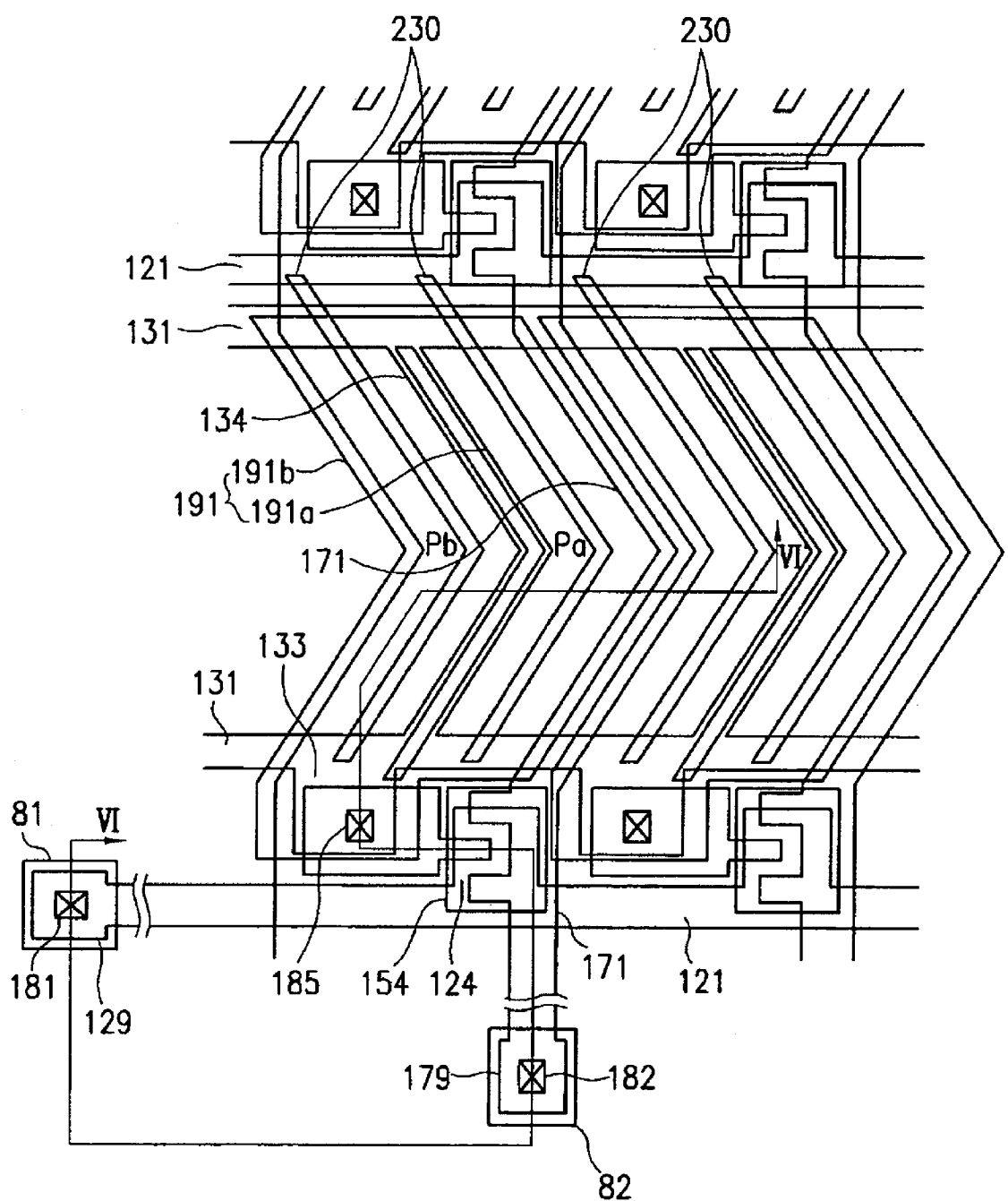
FIG. 5 is a layout view of an LCD according to another embodiment of the present is invention.
Figure 6:
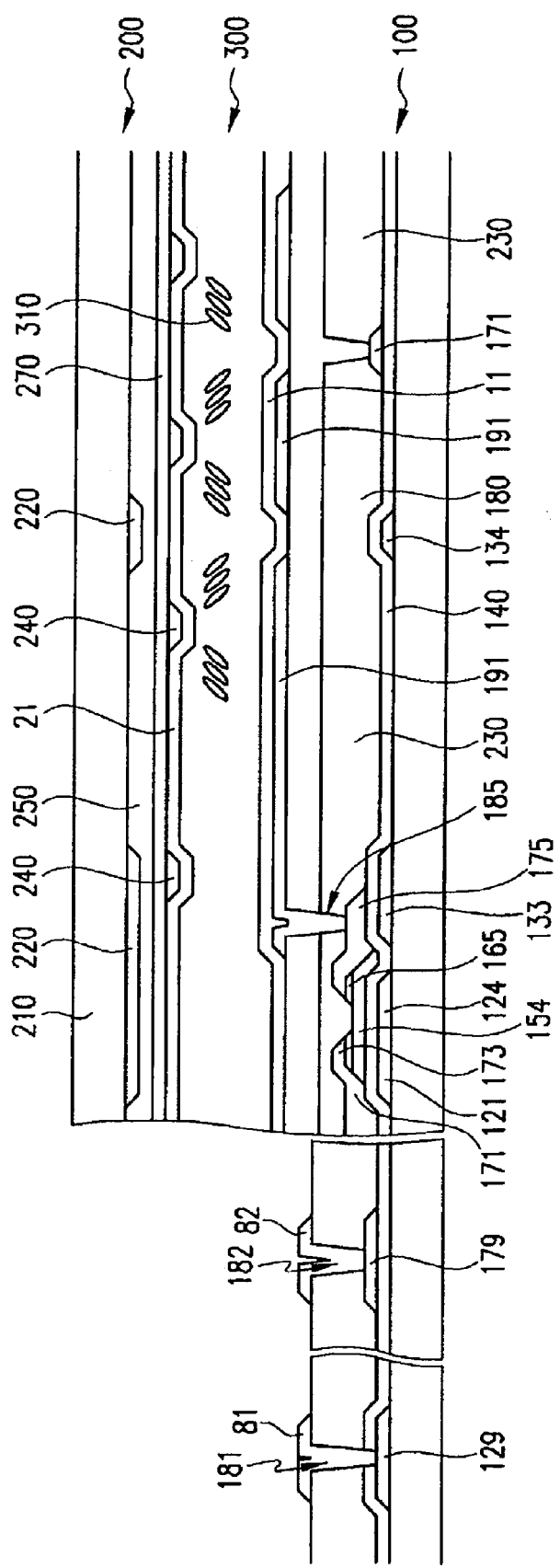
FIG. 6 is a sectional view of the LCD shown in FIG. 5 taken along the line VI-VI'.

FIG. 5 is a layout view of an LCD according to another embodiment of the present invention, and FIG. 6 is a sectional view of the LCD shown in FIG. 5 taken along the line VI-VI'.

As shown in FIGS. 5 and 6, a layered structure of a TFT array panel of an LCD according to this embodiment is almost the same as that shown in FIGS. 1 and 2. That is, a plurality of gate lines 121 including a plurality of gate electrodes 123 and a plurality of storage electrodes lines 131 including a plurality of storage electrodes 133 are formed on a substrate 110. A gate insulating layer 140, a plurality of semiconductor islands 154 and a plurality of ohmic contact islands 163 and 165 are sequentially formed thereon. A plurality of data lines 171 including a plurality of source electrodes 173 and a plurality of drain electrodes 175 are formed on the ohmic contacts 163 and 165, and a passivation layer 180 is formed thereon. A plurality of contact holes 182, 185 and 183 are provided at the passivation layer 180 and the gate insulating layer 140, and a plurality of pixel electrodes 190 and a plurality of contact assistants 192 and 199 are formed on the passivation layer 180. Finally, an alignment layer 11 is formed on the pixel electrodes 191 and the passivation layer 180.

In addition, a layered structure of a common electrode panel of the LCD according to this embodiment is almost the same as that shown in FIGS. 1 and 2. That is, a light blocking member 220, an overcoat 250, a common electrode 270, and a plurality of protrusions 240 as well as an alignment layer 21 are sequentially formed on an insulating substrate 210.

Different from the TFT array panel shown in FIGS. 1 and 2, a pair of partitions 191a and 191b forming a pixel electrode 191 are connected to each other at top and bottom such that a gap between the partitions 191a and 191b forms a cutout 91. Furthermore, each pixel electrode 191 is enclosed by a pair of adjacent data lines 171 and a pair of adjacent gate lines 121, and a pair of a gate line 121 and a data line 171 defined only one TFT located near a corner of a pixel electrode 191. Therefore, there is no symmetrical configuration in a pixel area including a pixel electrode 191 and a TFT.

In addition, the storage electrode lines 131 includes a plurality of pairs of transverse stems located near adjacent two gate lines 121 and a plurality of storage electrodes 134 connecting the transverse stems forming the pairs. The storage electrodes 134 supplied with the common voltage extend along the cutouts 91 of the pixel electrodes 191 to overlap the cutouts 91 such that it enhance the fringe field generated by the cutout 91. The width of the cutouts 91 with the storage electrodes 134 may be reduced to about 5 microns while the width of the cutouts 91 without the storage electrodes 134 for stable control of the alignment of the LC molecules 310 is preferably larger than about 10 microns. Accordingly, the aperture ratio can be increased by reducing the width of the cutouts 91.

Furthermore, a plurality of red, green and blue color filters 230 are formed under the passivation layer 180 opposite the pixel electrodes 190. Instead, there is no color filter on the common electrode panel 200. The contact holes 185 penetrate the color filters 230 for connection between the drain electrodes 175 and the pixel electrodes 191. Adjacent two of the color filters 230 may overlap each other to enhance the prevention of light leakage.

The passivation layer 180 may be made of organic insulating material or inorganic material, or it may include a lower inorganic film and an upper organic film.

The LC layer 300 may be in a twisted nematic mode where the LC molecules 310 are aligned parallel to the surfaces of the panels 100 and 200 and twisted by about 90 degrees from one panel to the other panel.

Many of the above-described features of the LCD shown in FIGS. 1 and 2 may be appropriate to the LCD shown in FIGS. 5 and 6.

A TFT array panel for an LCD according to another embodiment of the present invention will be described in detail with reference to FIGS. 7 and 8.

Figure 7:
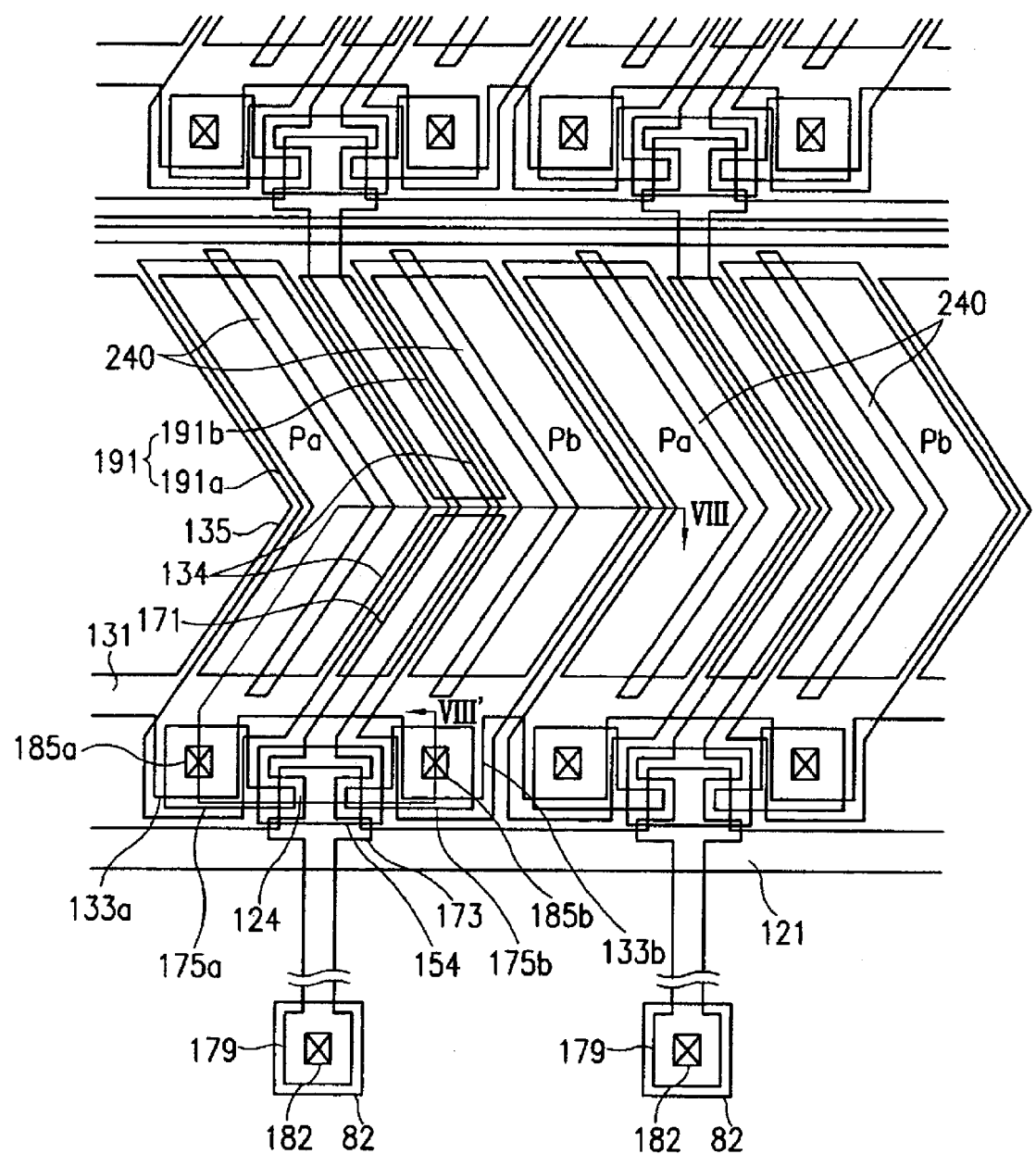
FIG. 7 is a layout view of an LCD according to another embodiment of the present invention.
Figure 8:
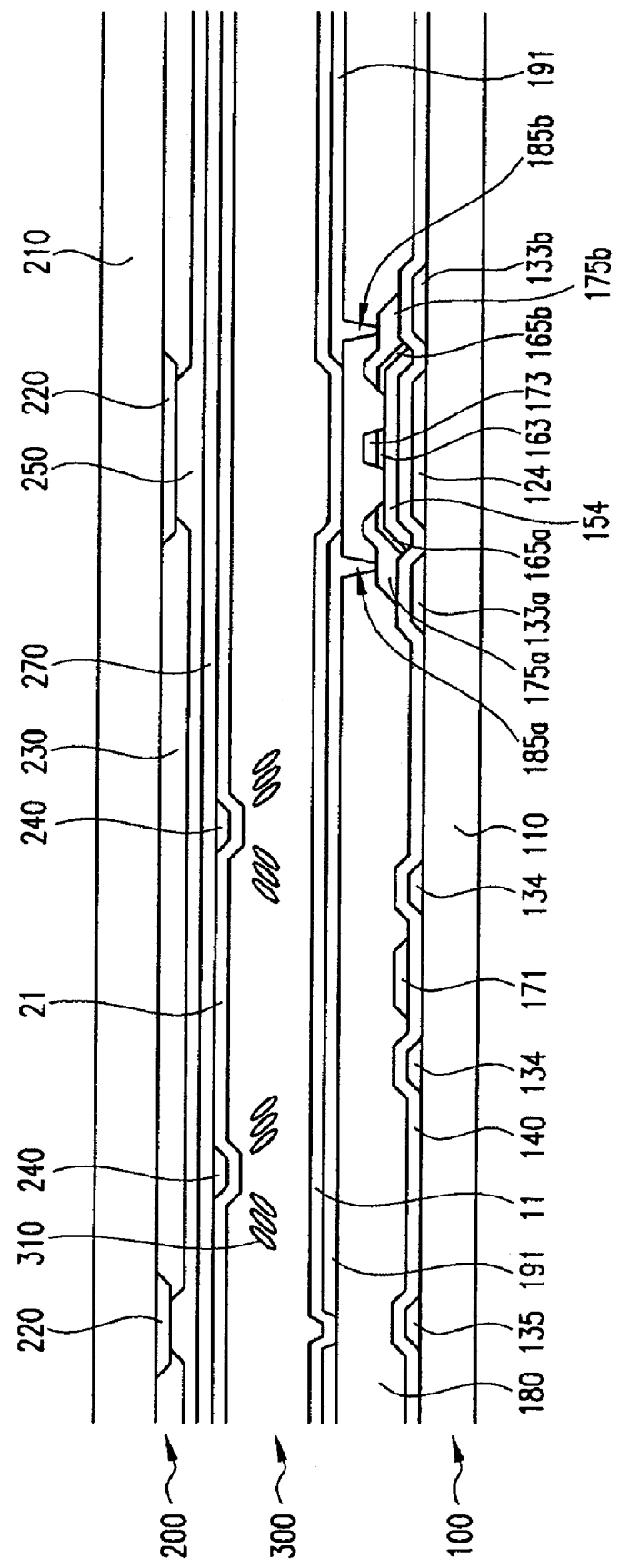
FIG. 8 is a sectional view of the LCD shown in FIG. 7 taken along the line VIII-VIII'.

FIG. 7 is a layout view of an LCD according to another embodiment of the present invention, and FIG. 8 is a sectional view of the LCD shown in FIG. 7 taken along the line VIII-VIII'.

As shown in FIGS. 7 and 8, a layered structure of a TFT array panel of an LCD according to this embodiment is almost the same as that shown in FIGS. 1 and 2. That is, a plurality of gate lines 121 including a plurality of gate electrodes 124 and a plurality of storage electrodes lines 131 including a plurality of storage electrodes 133a and 133b are formed on a substrate 110. A gate insulating layer 140, a plurality of semiconductor islands 151 and a plurality of ohmic contact islands 163, 165a and 165b are sequentially formed thereon. A plurality of data lines 171 including a plurality of source electrodes 173 and a plurality of drain electrodes 175a and 175b are formed on the ohmic contacts 163 and 165, and a passivation layer 180 is formed thereon. A plurality of contact holes 181, 185a, 185b and 183 are provided at the passivation layer 180 and the gate insulating layer 140, and a plurality of pixel electrodes 191 including a plurality of pairs of partitions 191a and 191b and a plurality of contact assistants 81 and 82 are formed on the passivation layer 180. Finally, an alignment layer 11 is formed on the pixel electrodes 191 and the passivation layer 180.

In addition, a layered structure of a common electrode panel of the LCD according to this embodiment is almost the same as that shown in FIGS. 1 and 2. That is, a light blocking member 220, a plurality of red, green and blue color filters 230, an overcoat 250, a common electrode 270, and a plurality of protrusions 240 as well as an alignment layer 21 are sequentially formed on an insulating substrate 210.

Different from the TFT array panel shown in FIGS. 1 and 2, the TFT array panel according to this embodiment does not provide expanded end portions 129 shown in FIG. 1. Instead, the TFT array panel may include a gate driving circuit (not shown) formed thereon along with TFTs and connected to the gate lines 121.

In addition, the storage electrode lines 131 includes a plurality of pairs of transverse stems located near adjacent two gate lines 121 and a plurality of storage electrodes 134 and 135 connecting the transverse stems forming the pairs. The storage electrodes 134 are disposed between the data lines 171 and the pixel electrodes 191 adjacent thereto such that they overlap edges of the pixel electrodes. The storage electrodes 135 are disposed between adjacent pixel electrodes 191 such that they overlap edges of the pixel electrodes 191. The pixel electrodes 191 do not overlap the data lines 171 to reduce the parasitic capacitance therebetween. The pixel electrodes 191 have symmetry with respect to the data lines 171, and thus the parasitic capacitance between the pixel electrode 191 and the data lines 171 can be uniformly maintained regardless of transverse alignment error. Accordingly, the voltages of the pixel electrodes 191 may not be distorted and thus the stains in a screen of the LCD can be prevented. Furthermore, there is no difference in luminance between exposure areas divided for step-and-repeat photolithography steps, thereby preventing stitch defects.

Many of the above-described features of the LCD shown in FIGS. 1 and 2 may be appropriate to the LCD shown in FIGS. 7 and 8.

A TFT array panel for an LCD according to another embodiment of the present invention will be described in detail with reference to FIGS. 9 and 10.

Figure 9:
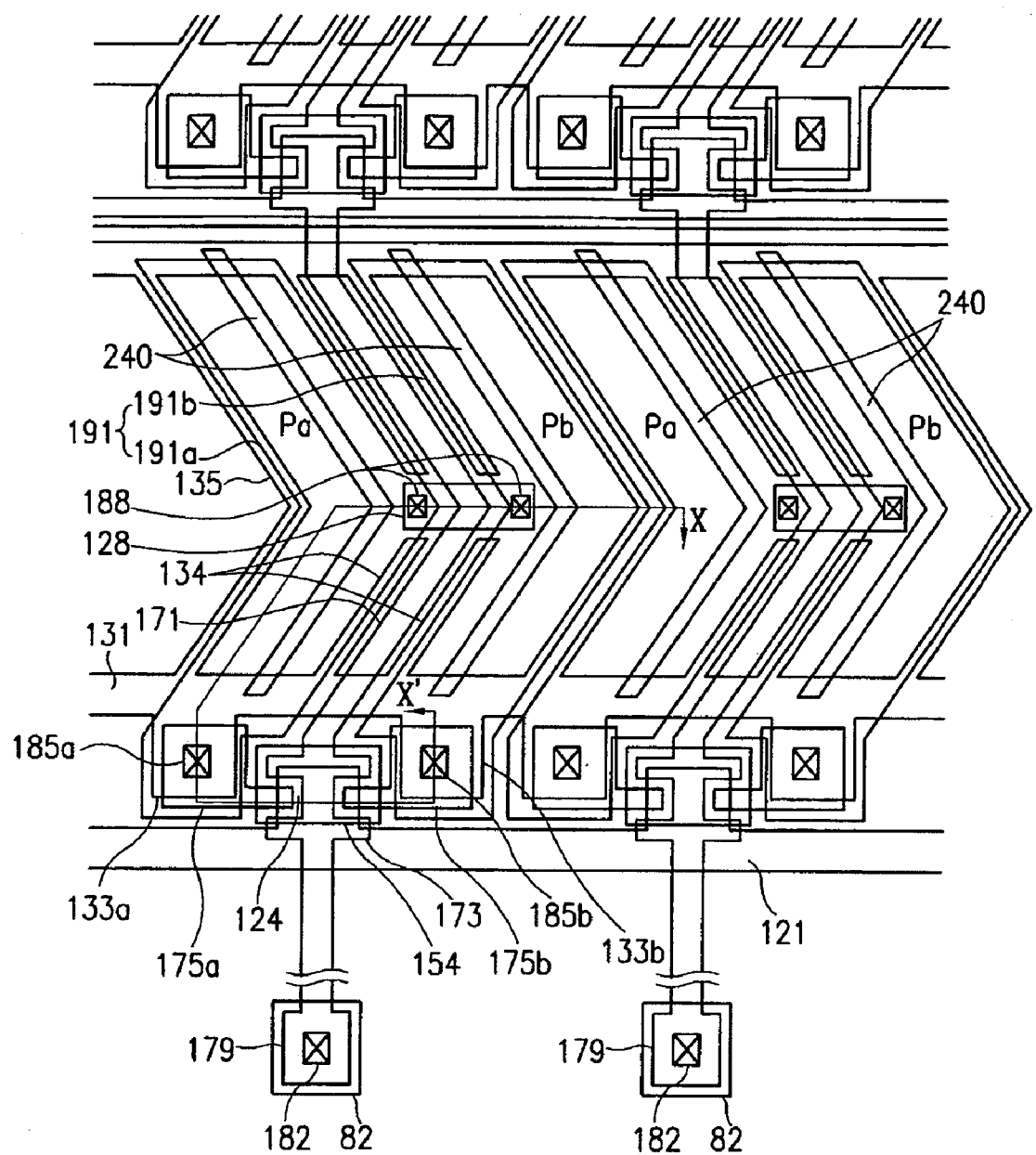
FIG. 9 is a layout view of an LCD according to another embodiment of the present invention.
Figure 10:
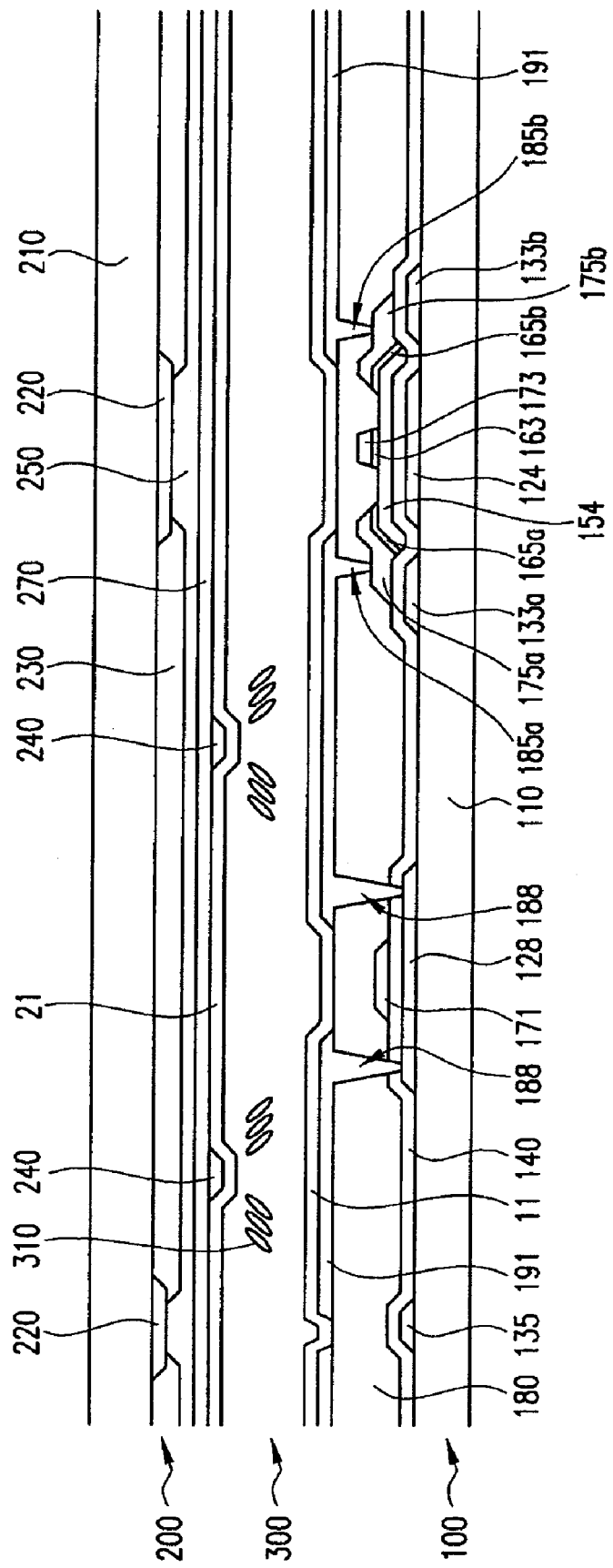
FIG. 10 is a sectional view of the LCD shown in FIG. 9 taken along the line X-X'.

FIG. 9 is a layout view of an LCD according to another embodiment of the present invention, and FIG. 10 is a sectional view of the LCD shown in FIG. 9 taken along the line X-X'.

As shown in FIGS. 9 and 10, a layered structure of a TFT array panel of an LCD according to this embodiment is almost the same as that shown in FIGS. 7 and 8. That is, a plurality of gate lines 121 including a plurality of gate electrodes 124 and a plurality of storage electrodes lines 131 including a plurality of storage electrodes 133a and 133b, 134 and 135 are formed on a substrate 110. A gate insulating layer 140, a plurality of semiconductor islands 151 and a plurality of ohmic contact islands 163, 165a and 165b are sequentially formed thereon. A plurality of data lines 171 including a plurality of source electrodes 173 and a plurality of drain electrodes 175a and 175b are formed on the ohmic contacts 163 and 165, and a passivation layer 180 is formed thereon. A plurality of contact holes 181, 185a, 185b and 183 are provided at the passivation layer 180 and the gate insulating layer 140, and a plurality of pixel electrodes 191 including a plurality of pairs of partitions 191a and 191b and a plurality of contact assistants 81 and 82 are formed on the passivation layer 180. Finally, an alignment layer 11 is formed on the pixel electrodes 191 and the passivation layer 180.

In addition, a layered structure of a common electrode panel of the LCD according to this embodiment is almost the same as that shown in FIGS. 7 and 8. That is, a light blocking member 220, a plurality of red, green and blue color filters 230, an overcoat 250, a common electrode 270, and a plurality of protrusions 240 as well as an alignment layer 21 are sequentially formed on an insulating substrate 210.

Different from the TFT array panel shown in FIGS. 7 and 8, the TFT array panel according to this embodiment provide a partition connection 128 between the partitions 191*a* and 191*b* forming each pixel electrode 191 by the same layer as the gate lines 121 and the storage electrode lines 131 not by the same layer as the pixel electrodes 191. For the provision of the partition connection 128, the storage electrodes 134 are disconnected near the partition connections 128 and the gate insulating layer 140 and the passivation layer 180 have a pair of contact holes 188 exposing both end portions of the partition connection 128 that crosses over a data line 171. The partitions 191*a* and 191*b* are connected to the partition connection 128 through the contact holes 188.

Many of the above-described features of the LCD shown in FIGS. 7 and 8 may be appropriate to the LCD shown in FIGS. 9 and 10.

A TFT array panel for an LCD according to another embodiment of the present invention will be described in detail with reference to FIGS. 11 and 12.

Figure 11:
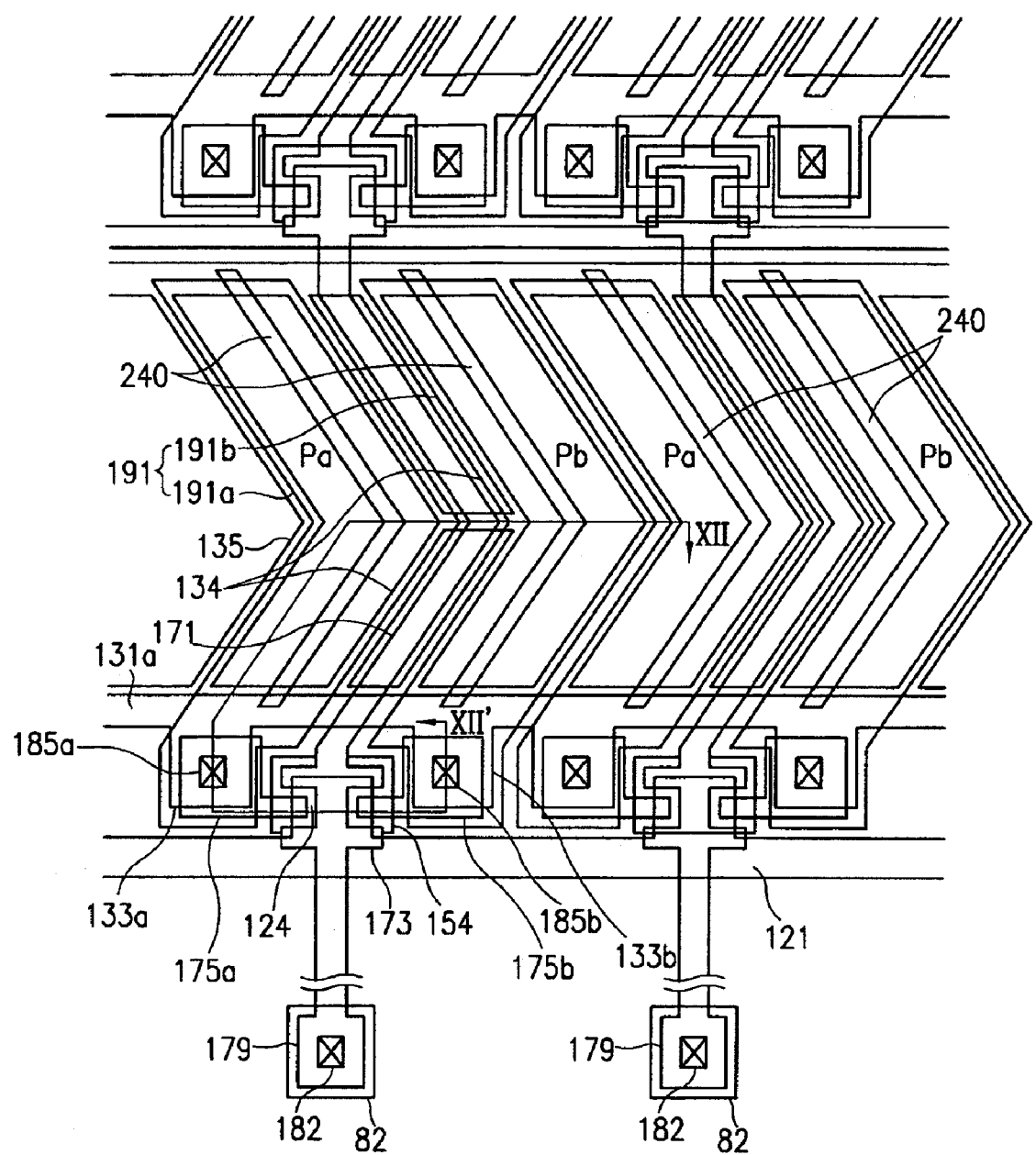
FIG. 11 is a layout view of an LCD according to another embodiment of the present invention.
Figure 12:
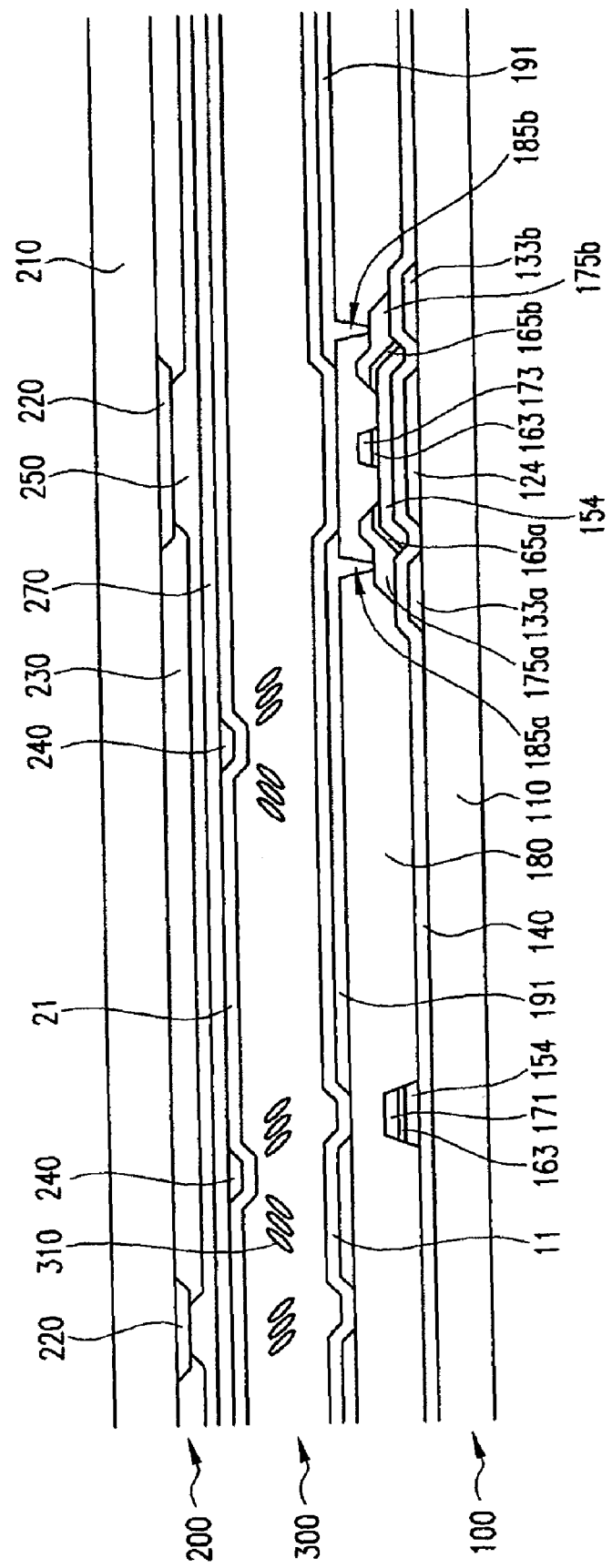
FIG. 12 is a sectional view of the LCD shown in FIG. 11 taken along the line XII-XII'.

FIG. 11 is a layout view of an LCD according to another embodiment of the present invention, and FIG. 12 is a sectional view of the LCD shown in FIG. 11 taken along the line XII-XII'.

As shown in FIGS. 11 and 12, a layered structure of a TFT array panel of an LCD according to this embodiment is almost the same as that shown in FIGS. 7 and 8. That is, a plurality of gate lines 121 including a plurality of gate electrodes 124 and a plurality of storage electrodes lines 131 including a plurality of storage electrodes 133*a* and 133*b*, 134 and 135 are formed on a substrate 110. A gate insulating layer 140, a plurality of semiconductor stripes 152 and a plurality of ohmic contact stripes and islands 163, 165*a* and 165*b* are sequentially formed thereon. A plurality of data lines 171 including a plurality of source electrodes 173 and a plurality of drain electrodes 175*a* and 175*b* are formed on the ohmic contacts 163 and 165, and a passivation layer 180 is formed thereon. A plurality of contact holes 181, 185*a*, 185*b* and 183 are provided at the passivation layer 180 and the gate insulating layer 140, and a plurality of pixel electrodes 191 including a plurality of pairs of partitions 191*a* and 191*b* and a plurality of contact assistants 81 and 82 are formed on the passivation layer 180. Finally, an alignment layer 11 is formed on the pixel electrodes 191 and the passivation layer 180.

In addition, a layered structure of a common electrode panel of the LCD according to this embodiment is almost the same as that shown in FIGS. 7 and 8. That is, a light blocking member 220, a plurality of red, green and blue color filters 230, an overcoat 250, a common electrode 270, and a plurality of protrusions 240 as well as an alignment layer 21 are sequentially formed on an insulating substrate 210.

Different from the TFT array panel shown in FIGS. 7 and 8, the TFT array panel according to this embodiment extends the semiconductors 152 and the ohmic contacts 163 along the data lines 171.

The semiconductor stripes 152 have almost the same planar shapes as the data lines 171 and the drain electrodes 175*a* and 175*b* as well as the underlying ohmic contacts 163 and 165, except for channel portions 154 of the TFTs.

Furthermore, a pair of partitions 191*a* and 191*b* of a pixel electrode 191 are disconnected from each other.

A manufacturing method of the TFT array panel according to an embodiment simultaneously forms the data lines 171, the drain electrodes 175*a* and 175*b*, the semiconductors 152, and the ohmic contacts 163 and 165 using one photolithography process. A photoresist pattern for the photolithography process has position-dependent thickness, and in particular, it has portions with smaller thickness located on the channels of TFTs. As a result, a photolithography process can be omitted to simplify the manufacturing process.

Many of the above-described features of the LCD shown in FIGS. 7 and 8 may be appropriate to the LCD shown in FIGS. 11 and 12.

While the present disclosure of invention has been provided in detail with reference to embodiments described herein, those skilled in the pertinent art will appreciate from the foregoing that various modifications and substitutions can be made thereto without departing from the spirit and scope of the present teachings.

What is claimed is:

1. A thin film transistor array panel comprising:
   a substrate;
   a first signal line formed on the substrate and extending in a first wiring layer;
   a second signal line formed on the substrate and extending in a second wiring layer to cross with the first signal line;
   a first thin film transistor and a second thin film transistor that are respectively connected to the first and the second signal lines;
   a pixel electrode that is partitioned to have first and second partitions,
      wherein the first and second partitions have respective first and second partition boundary edges, with the first partition boundary edge being spaced apart from and facing the second partition boundary edge,
      wherein the first signal line extends underneath the first and second partitions and along a not straight path also disposed under the first and second partitions, and
      wherein the first and second spaced apart partition boundary edges of the respective first and second partitions respectively extend along and above opposed sides of the not straight path, and
   a connection electrically connecting the first partition and the second partition;
   wherein the connection is disposed in the same wiring layer as that of the second signal line.

2. A thin film transistor array panel comprising:
   a substrate;
   a gate line formed on the substrate and including a gate electrode the gate line extending in a first wiring layer on the substrate;
   a gate insulating layer formed on the gate line;
   a semiconductor layer formed on the gate insulating layer;
   a data line extending in a second wiring layer on the substrate, the data line crossing with the gate line and having a source electrode integrally extending from the data line;
   a first drain electrode formed at least partially on the semiconductor layer to be disposed opposite the source electrode;
   a passivation layer formed on the semiconductor layer; and
   a pixel electrode,
      wherein the pixel electrode is partitioned to have first and second partitions,
      wherein the first and second partitions have respective first and second partition boundary edges, with the first partition boundary edge being spaced apart from and facing the second partition boundary edge,
      wherein the data line extends underneath the first and second partitions and along a not straight path also disposed under the first and second partitions, and
      wherein the first and second spaced apart partition boundary edges of the respective first and second partitions respectively extend along and above opposed sides of the not straight path; and a connection providing an electrical connection between the first partition and the second partition;

wherein the connection is disposed in the same wiring layer as that of the gate line and the connection crosses with the data line.

3. A liquid crystal display comprising:

a first substrate;

a first signal line formed on the first substrate to extend in a first wiring layer of the first substrate;

a second signal line formed on the first substrate to extend in a second wiring layer of the first substrate and to cross with the first signal line;

a first thin film transistor connected to the first and the second signal lines;

a pixel electrode that is partitioned to have first and second partitions, wherein the first and second partitions have respective first and second partition boundary edges, with the first partition boundary edge being spaced apart from and facing the second partition boundary edge, wherein the second signal line extends underneath the first and second partitions and along a not straight path also disposed under the first and second partitions, and wherein the first and second spaced apart partition boundary edges of the respective first and second partitions respectively extend along and above opposed sides of the not straight path;

a second thin film transistor connected to the second partition of the pixel electrode, wherein the first thin film transistor is connected to the first partition of the pixel electrode;

a second substrate facing the first substrate;

a common electrode formed on the second substrate; a liquid crystal layer interposed between the first substrate and the second substrate; and a domain defining member dividing the liquid crystal layer into a plurality of domains, each domain having two primary edges parallel to corresponding portions of the second signal line;

wherein the liquid crystal layer has negative dielectric anisotropy and is aligned substantially perpendicular to a surface of the first and the second substrates.

4. A liquid crystal display comprising:

a first substrate;

a first signal line formed on the first substrate to extend in a first wiring layer of the first substrate;

a second signal line formed on the first substrate to extend in a second wiring layer of the first substrate and to cross with the first signal line;

a first thin film transistor connected to the first and the second signal lines;

a pixel electrode that is partitioned to have first and second partitions, wherein the first and second partitions have respective first and second partition boundary edges, with the first partition boundary edge being spaced apart from and facing the second partition boundary edge, wherein the second signal line extends underneath the first and second partitions and along a not straight path also disposed under the first and second partitions, and wherein the first and second spaced apart partition boundary edges of the respective first and second partitions respectively extend along and above opposed sides of the not straight path;

a second thin film transistor connected to the second partition of the pixel electrode, wherein the first thin film transistor is connected to the first partition of the pixel electrode;

a second substrate facing the first substrate;

a common electrode formed on the second substrate; a liquid crystal layer interposed between the first substrate and the second substrate; and a domain defining member dividing the liquid crystal layer into a plurality of domains, each domain having two primary edges parallel to corresponding portions of the second signal line;

wherein the liquid crystal layer has positive dielectric anisotropy and is aligned substantially parallel to a surface of the first and the second substrates and twisted from the first substrate to the second substrate.

5. The thin film transistor array panel of claim 1, wherein the not straight path of the first signal line includes a plurality of angled linear segments including a first angled linear segment that is angled at a first non-parallel and non-orthogonal angle relative to a linear extension direction of the second signal line and a second angled linear segment that is angled at a different second non-parallel and non-orthogonal angle relative to the linear extension direction of the second signal line, and wherein the connection crosses under an angle change region of the first signal line where the first and second angled linear segments meet.

6. The thin film transistor array panel of claim 1, wherein the first and the second partitions are disposed opposite each other with respect to the first signal line, and the first and the second thin film transistors are disposed opposite each other with respect to the first signal line.

7. The thin film transistor array panel of claim 1, wherein the first thin film transistor is connected to the first partition of the pixel electrode, and the second partition of the pixel electrode is connected to the second thin film transistor.

8. The thin film transistor array panel of claim 2, wherein the data line includes a plurality of angled linear segments including a first angled linear segment that is angled at a first non-parallel and non-orthogonal angle relative to a linear extension direction of the gate line and a second angled linear segment that is angled at a different second non-parallel and non-orthogonal angle relative to the linear extension direction of the gate line, wherein the connection crosses under an angle change region of the data line where the first and second angled linear segments meet.

9. The thin film transistor array panel of claim 2, wherein the first and the second partitions are disposed opposite each other with respect to the data line, and the first and the second drain electrodes are disposed opposite each other with respect to the data line.

10. The thin film transistor array panel of claim 2, wherein the first drain electrode is connected to the first partition of the pixel electrode, and the second partition of the pixel electrode is connected to a second drain electrode.

* * * * *